3,452,756
MEDICAL CATHETER WITH PLASTIC BALLOON REQUIRING LOW INFLATION FORCE AND METHOD OF MAKING SAME
Andrew Harautuneian, Gardena, Calif., assignor, by mesne assignments, to American Hospital Supply Corporation, a corporation of Illinois
Continuation-in-part of applications Ser. No. 267,723 and Ser. No. 267,724, Mar. 25, 1963. This application Oct. 10, 1966, Ser. No. 585,638
Int. Cl. A61m 25/00
U.S. Cl. 128—349                    4 Claims

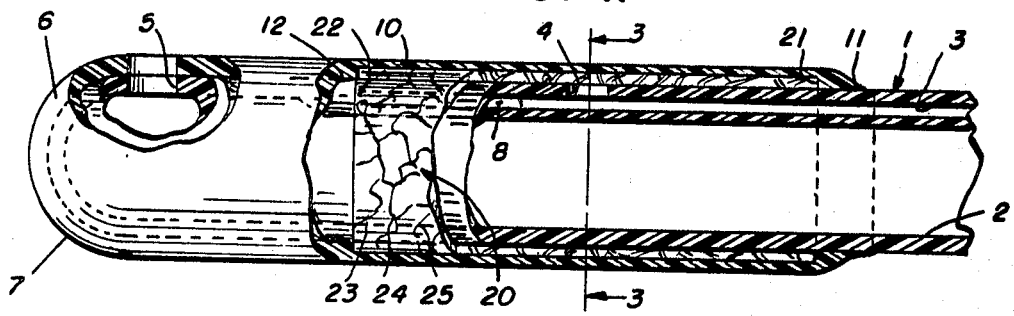
FIG. 1.
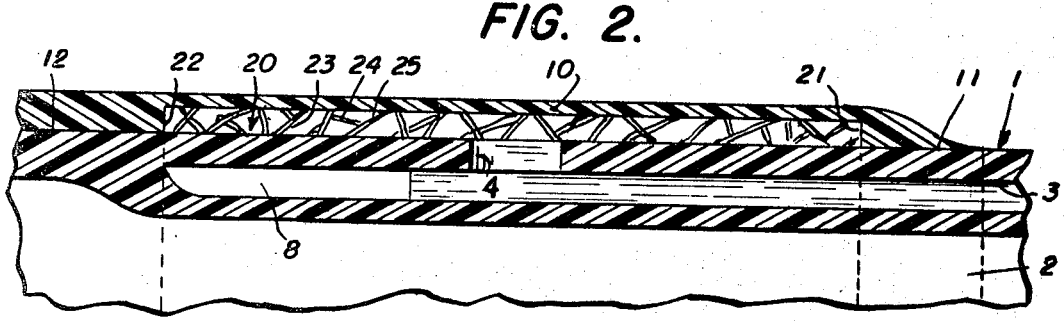
FIG. 2.
FIG. 5.
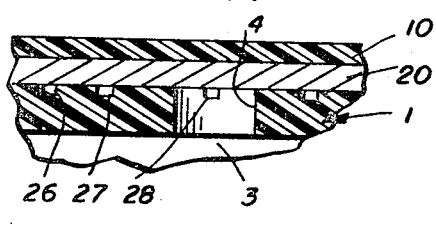
FIG. 3.
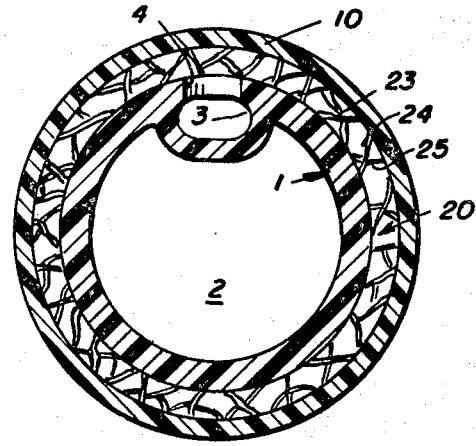
FIG. 4.
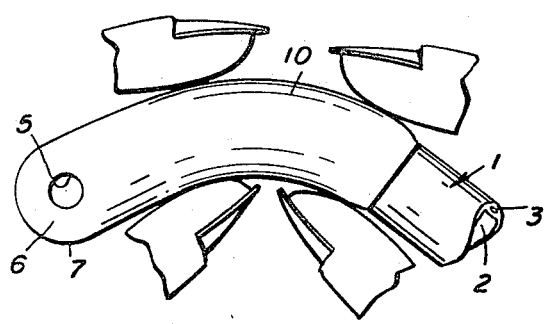
INVENTOR
ANDREW HARAUTUNEIAN
BY
*Larry N. Barger*
ATTORNEY United States Patent Office 3,452,756
Patented July 1, 1969

ABSTRACT OF THE DISCLOSURE

A medical catheter and method for producing the same, in which an inflatable balloon communicates with an inflation passage into which an inflating liquid is administered, the balloon being separated from the catheter by a dissolvable coating material having at least one crack for insuring dispersal of the inflating liquid and uniform inflation of the balloon, and the crack being formed by subjecting the dissolvable layer to tension.

---

This invention is a continuation-in-part of my copending applications entitled, "Method of Catheter Manufacture," Ser. No. 267,723, issued as Letters Patent 3,304,353 on Feb. 14, 1967, and "Catheter," Ser. No. 267,724, issued as Letters Patent 3,292,627 on Dec. 20, 1966, both of which were filed Mar. 25, 1963.

Balloon catheters for insertion through a patient's urethral canal and into his bladder are comprised of a dual lumen tube wtih an inflatable retention balloon attached thereto. One lumen of the tube drains liquid through the catheter from the patient. The second lumen communicates with the balloon through an inflation opening in the catheter wall and carries liquid to inflate the balloon.

For years, these balloon catheters have been made of rubber by a process including dipping a mandrel in a latex bath to form a dual lumen tube. After removing the tube from the mandrel and cutting an inflation opening in the side wall, a zone adjacent the inflation opening was vulcanized or treated with bromine to cure the rubber in this area. Next, the tube was dipped in a water suspension of latex to form the rubber balloon which bonded to the rubber tube beyond ends of the vulcanized or bromine-treated zone.

These rubber catheters were very tedious and expensive to make and also had the disadvantage of requiring curing and vulcanizing agents which irritate the tender urethral canal of some patients. With these recognized problems, there was a long-felt need for a catheter free from vulcanizing and curing agents and which was simple to make. Applicant satisfied this need by providing an "all plastic" catheter with a unique combination of a water soluble partitioning coating sandwiched between a thermoplastic tube and an elastomeric thermoplastic balloon. This catheter and how it is made is described in detail in the above copending applications.

Applicant's "all plastic" catheter balloon is inflated by water forced in through the inflation lumen and inflation opening to both dissolve the partitioning coating and also inflate the balloon. When a nurse or doctor connects a syringe to the catheter and begins to inject water to inflate the balloon, air within the inflation lumen is compressed into a forward end of the lumen until the water hits the partitioning coating. As soon as the water dissolved away a portion of the partitioning coating, the small amount of compressed air could dissipate throughout the balloon. In order to obviate an excessive building of pressure at concentrated areas, it is desirable that the inflating medium be introduced as rapidly as possible and at a minimum inflating pressure.

Also, as the physician or nurse forces the water into the balloon, it begins to inflate adjacent this inflation opening before the partitioning coating about the tube is completely dissolved. It takes a few seconds for the partitioning coating to completely dissolve in the water. It is highly desirable to uniformly inflate the balloon, equalize pressure distribution throughout, and inflate the balloon uniformly.

To minimize balloon inflation pressures, and insure uniform and rapid balloon inflation, applicant has made an improvement relative to the water soluble partitioning coating of his catheter. This continuation-in-part application pertains to such improvement which includes a series of channels beneath the balloon layer to dissipate air from the inflation opening and to quickly distribute the inflation liquid as it dissolves the partitioning coating. In one embodiment these channels are in the partitioning coating, and in another embodiment they are formed in the flexible tube's outer surface. This invention also relates to a method of forming these channels.

Perhaps the invention can be better understood with reference to the following drawings, in which:

FIGURE 1 is a side elevational view of a proximate end of the catheter with a portion of the balloon cut away to show a first embodiment of this invention with a series of channels in the partitioning coating;

FIGURE 2 is an enlarged fragmentary sectional view of the plastic balloon layer, plastic tube and partitioning coating of FIGURE 1;

FIGURE 3 is an enlarged sectional view taken along line 3—3 of FIGURE 1;

FIGURE 4 is a side elevational view of the catheter of FIGURE 1 showing a step in the manufacture of this improved catheter; and FIGURE 5 is an enlarged fragmentary sectional view showing a second embodiment of my invention with the series of channels in the flexible tube.

With reference to the drawings, the catheter comprises an elongated flexible thermoplastic tube 1 with a wall defining a main drainage lumen 2 and a smaller inflation lumen 3, the latter of which communicates with an exterior of the tube through an inflation opening 4. A proximate end 7 of this tube 1 has a rounded nose 6 and a drainage port 5. Water soluble partitioning coating 20 such as polyvinyl alcohol, methylcellulose or polyvinyl pyrrolidone forms a cylinder extending between ends 21 and 22, which cylinder surrounds the tube adjacent inflation opening 4. About an exterior of partitioning coating 20 is an elastomeric thermoplastic balloon layer 10 such as Goodrich Chemical Company's Estane #5740x1.

In a first embodiment, the partitioning coating 20 has a series of channels or cracks as represented by 23, 24 and 25 about its periphery. As water or air is forced in through inflation lumen 3 and out through inflation opening 4, this water or air is distributed throughout the circumference of the partitioning coating 20 by these channels 23, 24 and 25. Thus, the balloon inflates evenly and with a low inflation force because the aqueous inflation media can quickly get to different areas of the balloon and simultaneously stretch them evenly. The entire charge of 5 cc. or 10 cc. water is not forced into a highly strained bubble adjacent the inflation opening 4. Also, these channels dissipate the air from inflation lumen 3 so the operator does not have to compress all this air into air pocket 8.

There is a great difference in inflation forces required with and without the series of cracks or channels 23, 24 and 25. A catheter with a balloon of the aforementioned Estane encasing a water soluble partitioning coating 20

(without cracks) requires 18 to 35 lbs. force applied to a 10 cc. syringe to start inflation of a balloon while a catheter (with cracks) requires only 9 to 12 lbs. force on the syringe to start inflation. Once it starts to inflate, the balloon of the latter catheter has an inflation force that levels off at about 6 lbs.

The unique way of forming the channels or cracks in the partitioning coating involves preparing the catheter by forming the dual lumen tube 1 with an inflation opening 4 and then applying water soluble partitioning coating 20 about tube 1. Next, the thermoplastic elastomeric balloon layer 10 is applied onto the partitioning coating 20 with the balloon ends 11 and 12 bonding to the tube 1 beyond ends 21 and 22 of the partitioning coating 20. Finally, the assembled catheter is stretched, thus cracking the partitioning coating 20 encased between balloon 10 and tube 1. The percent elongation at break of the partitioning coating 20 is substantially less than the percent elongation at break of either the balloon 10 or tube 1. During this crack-forming step the catheter is strecthed sufficiently to break the partitioning coating 20 but not sufficiently to break either the balloon 10 or tube 1.

The term "stretching" used in the specification and claims means that the catheter may be stretched along its longitudinal axis or alternatively may be stretched by a bending motion as in FIGURE 4. If the latter procedure is used, it is preferable to roll the bent catheter so all sides will be stretched as is the upper side in FIGURE 4.

In a second embodiment of this invention (FIGURE 5), series of channels 26, 27 and 28 are formed in the flexible tube's outer surface to carry inflation media away from inflation opening 4. These channels 26, 27 and 28 are formed prior to applying the partitioning coating 20 and balloon layer 10 to flexible tube 1.

In the foregoing specification I have used a specific embodiment to illustrate my invention. However, it is understood by those skilled in the art that certain modifications to this embodiment can be made without departing from the spirit and scope of the invention.

I claim:
1. A medical catheter comprising:
 (a) a flexible thermoplastic tube with a wall defining a main drainage lumen extending from a distal end to a proximate end, which proximate end is adapted for insertion into a patient and with a port adjacent the proximate end through which fluid can enter the main drainage lumen, said flexible thermoplastic tube having associated therewith an inflation lumen extending longitudinally along said tube wall with the inflation lumen communicating with an exterior surface of the tube wall through an inflation opening;
 (b) a partitioning coating surrounding an exterior surface of the tube wall about said inflation opening; and
 (c) an elastic thermoplastic balloon layer bonded to the tube beyond ends of said coating and encasing said coating between said balloon layer and said tube, said catheter defining means enclosed by said balloon layer for carrying inflation media away from the inflation opening so this inflation media can exert inflating forces simultaneously on various areas of the balloon, said coating having the property of being completely and totally dissolved in an aqueous inflating liquid introduced through said inflation lumen and inflation opening to expand said balloon layer, whereby completely dissolved coating material can exit through said inflation opening and along the inflation lumen upon deflation of said balloon layer, said partitioning coating defining the means in the form of at least one crack leading from the inflation opening.

2. The medical catheter as set forth in claim 1 in which said partitioning coating includes a plurality of randomly disposed cracks extending circumferentially about said partitioning coating.

3. A method of making a medical catheter comprising:
 (a) forming a dual lumen flexible thermoplastic tube with a drainage lumen and an inflation lumen and with an inflation opening through a wall of the tube connecting the inflation lumen with an exterior surface of the tube;
 (b) applying an aqueous-soluble, substantially impervious coating about a cylindrical area of the exterior surface of the tube including the inflation opening;
 (c) applying an elastomeric thermoplastic balloon layer upon the partitioning coating, said balloon layer bonding to the flexible tube beyond ends of the partitioning coating; and
 (d) subsequently forming at least one crack in the partitioning coating after the elastomeric balloon layer has been applied for carrying inflation media away from the inflation opening and distributing the inflation media to various areas of the partitioning layer so that the balloon layer will be substantially uniformly inflated, said thermoplastic flexible tube and elastomeric balloon layer each having substantially greater percent elongation at break than the partitioning coating and forming the crack in said partitioning coating by stretching the catheter at the inflation area, the extent of stretching being beyond the percent elongation of break of the partitioning coating but less than the percent elongation at break of either the balloon layer or the flexible tube.

4. A method of making a medical catheter as set forth in claim 3 wherein the stretching of the catheter is done with a bending motion.

References Cited

UNITED STATES PATENTS

| | | | |
|---|---|---|---|
| 2,912,981 | 11/1959 | Keough | 128—349 |
| 3,034,510 | 5/1962 | Kittel | 128—349 |
| 3,292,627 | 12/1966 | Harautuneian | 128—349 |

CHARLES F. ROSENBAUM, *Primary Examiner.*

U.S. Cl. X.R.

264—264